United States Patent
Armangau et al.

(10) Patent No.: US 11,216,195 B1
(45) Date of Patent: Jan. 4, 2022

(54) SHARING BLOCKS OF NON-VOLATILE DATA STORAGE TO SUPPORT CACHE FLUSHES IN A MULTI-NODE DATA STORAGE SYSTEM

(71) Applicant: EMC IP Holding Company LLC, Hopkinton, MA (US)

(72) Inventors: Philippe Armangau, Acton, MA (US); Vamsi K. Vankamamidi, Hopkinton, MA (US); Bruce E. Caram, Hudson, MA (US); Ajay Karri, South Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/945,383

(22) Filed: Jul. 31, 2020

(51) Int. Cl.
*G06F 3/06* (2006.01)
*G06F 12/0871* (2016.01)
*G06F 12/0804* (2016.01)

(52) U.S. Cl.
CPC .......... *G06F 3/0631* (2013.01); *G06F 3/0604* (2013.01); *G06F 12/0804* (2013.01); *G06F 12/0871* (2013.01); *G06F 3/0689* (2013.01); *G06F 2212/604* (2013.01)

(58) Field of Classification Search
CPC .. G06F 3/0631; G06F 3/0604; G06F 12/0804; G06F 12/0871; G06F 3/0689; G06F 2212/604
See application file for complete search history.

(56) References Cited

U.S. PATENT DOCUMENTS

| | | | | |
|---|---|---|---|---|
| 9,841,912 | B1* | 12/2017 | Liang | G06F 16/2246 |
| 2002/0112113 | A1* | 8/2002 | Karpoff | G06F 3/0665 |
| | | | | 711/4 |
| 2007/0276878 | A1* | 11/2007 | Zheng | G06F 16/125 |

* cited by examiner

*Primary Examiner* — Charles Rones
*Assistant Examiner* — Hewy H Li
(74) *Attorney, Agent, or Firm* — BainwoodHuang (57) ABSTRACT

An allocation history is maintained for each node in a multi-node data storage system. The allocation history for each node indicates sets of physical blocks previously allocated to the node to store dirty pages of user data flushed from a cache of the node. The allocation history indicates non-quarantined sets of physical blocks that are currently being used to provide non-volatile data storage to cache flush operations, and quarantined sets of physical blocks not currently being used to provide non-volatile data storage to cache flush operations. Allocation is prevented to any node of any set of physical blocks that is indicated as non-quarantined by any of the allocation histories, and of any set of physical blocks that is indicated as quarantined by any of the allocation histories.

17 Claims, 6 Drawing Sheets

---

500 IN RESPONSE TO AN ALLOCATION REQUEST FROM A NODE, ALLOCATION LOGIC IDENTIFIES AN UNALLOCATED SET OF PHYSICAL BLOCKS THAT IS NOT INDICATED BY THE QUARANTINED OR NON-QUARANTINED PORTION OF ANY ALLOCATION HISTORY OF ANY NODE

↓

502 THE ALLOCATION LOGIC ALLOCATES THE SET OF PHYSICAL BLOCKS TO THE NODE

↓

504 AN INDICATION OF THE SET OF PHYSICAL BLOCKS IS ADDED TO THE NON-QUARANTINED PORTION OF THE NODE'S ALLOCATION HISTORY

↓

506 FREE PHYSICAL BLOCKS ARE PROVIDED FROM THE SET OF PHYSICAL BLOCKS TO THE NODE'S FLUSH LOGIC TO STORE DIRTY PAGES OF USER DATA FLUSHED FROM THE NODE'S CACHE

↓

508 THE NODE DETERMINES THAT FREE SPACE WITHIN SET OF PHYSICAL BLOCKS HAS BEEN FULLY CONSUMED AND STOPS PROVIDING FREE PHYSICAL BLOCKS FROM THE SET OF PHYSICAL BLOCKS TO THE NODE'S FLUSH LOGIC

↓

510 THE STATE OF THE SET OF PHYSICAL BLOCKS IS CHANGED, AND THE INDICATION OF THE SET OF PHYSICAL BLOCKS IS MOVED TO THE QUARANTINED PORTION OF THE NODE'S ALLOCATION HISTORY

↓

512 THE INDICATION OF THE SET OF PHYSICAL BLOCKS IS KEPT IN THE QUARANTINED PORTION OF THE NODE'S ALLOCATION HISTORY UNTIL AFTER A PREDETERMINED NUMBER OF INDICATIONS OF OTHER SETS OF PHYSICAL BLOCKS ARE SUBSEQUENTLY MOVED TO THE QUARANTINED PORTION OF THE NODE'S ALLOCATION HISTORY

↓

514 THE INDICATION OF SET OF PHYSICAL BLOCKS IS REMOVED FROM THE NODE'S ALLOCATION HISTORY

↓

516 THE SET OF PHYSICAL BLOCKS IS AVAILABLE FOR REALLOCATION BY THE ALLOCATION LOGIC

SHARING BLOCKS OF NON-VOLATILE DATA STORAGE TO SUPPORT CACHE FLUSHES IN A MULTI-NODE DATA STORAGE SYSTEM

TECHNICAL FIELD

The present disclosure relates generally to intelligent data storage systems that cache received user data, and more specifically to technology for sharing blocks of non-volatile data storage to support cache flushes in a multi-node data storage system.

BACKGROUND

Multi-node data storage systems are arrangements of hardware and software that include multiple nodes, sometimes referred to as storage processors, that are coupled to a shared set of non-volatile data storage drives, such as solid state drives and/or magnetic disk drives. In some multi-node data storage systems, multiple nodes may simultaneously be "active", in that they concurrently service host I/O requests received from physical and/or virtual host machines ("hosts"). The host I/O requests received and processed by a node may specify one or more storage objects (e.g. logical units ("LUNs"), and/or files etc.) that are hosted by the storage system and store user data that is written and/or read by the hosts. Each node independently executes software that processes host I/O requests and performs various data processing tasks to organize and store user data received from the hosts in the shared non-volatile data storage drives.

While processing host I/O requests that write user data to the shared non-volatile data storage, each node initially stores the user data indicated by the requests it processes into a cache contained within the node, before the user data is subsequently flushed from the cache and stored into the shared non-volatile data storage drives. Successful storage of user data into a node's cache may enable the data storage system to promptly acknowledge successful completion of corresponding host I/O write requests. Storing user data into the cache of a node may further enable the data storage system to service subsequently received host I/O read requests directed to the same data without delays caused by accessing the shared non-volatile data storage drives of the data storage system. User data stored in cache is moved to the shared non-volatile data storage drives of the data storage system by flush operations performed by the node that contains the specific cache being flushed.

Pages of user data stored in cache are considered dirty when they contain user data that has not yet been stored into the shared non-volatile data drives of the data storage system. Dirty pages are flushed from each node's cache to pages of the shared non-volatile data storage. The pages of non-volatile data storage are contained within larger physical blocks of non-volatile data storage. Physical blocks containing the pages of non-volatile data storage that can be used to store dirty pages of host data flushed from the cache of each node may be organized into sets of physical blocks.

SUMMARY

In some previous data storage systems, in order to avoid multiple nodes contending for the same physical blocks of non-volatile data storage to store the dirty pages flushed from their respective individual caches, specific sets of physical blocks were statically reserved for use by corresponding individual nodes. For example, in some previous data storage systems having two nodes, all sets of physical blocks associated with even number identifiers were statically assigned to a first one of the two nodes, and then used exclusively for storing dirty pages flushed from that node's cache, and all sets of physical blocks associated with odd number identifiers were statically assigned to a second one of the two nodes, and then used exclusively for storing dirty pages flushed from that node's cache. Such static assignment of sets of physical blocks to specific individual nodes is inflexible and inefficient, and undesirable from the perspective of optimal system resource utilization under multiple different and/or dynamically changing operational conditions.

To address the above described and/or other shortcomings of previous technologies, new technology is disclosed herein that maintains, for each node in a multi-node data storage system, an allocation history indicating sets of physical blocks previously allocated to the node to store dirty pages of user data flushed from a cache of the node. The allocation history maintained for each node indicates a number of non-quarantined sets of physical blocks that are currently allocated to the node and that are currently being used to provide non-volatile data storage to cache flush operations that store dirty pages of user data flushed from the cache of the node. The allocation history for each node also indicates a number of quarantined sets of physical blocks that are no longer allocated to the node, and that are also not currently being used to provide non-volatile data storage to cache flush operations that store dirty pages of user data flushed from the cache of the node. The disclosed technology processes requests from the nodes of the multi-node data storage system for allocation of sets of physical blocks to store dirty pages of user data flushed from their caches by reading all the allocation histories maintained by the nodes of the multi-node data storage system, and then preventing allocation of any sets of physical blocks that are indicated as non-quarantined by any of the allocation histories, and also preventing allocation of any sets of physical blocks that are indicated as quarantined by any of the allocation histories. In this way, only sets of physical blocks are allocated that are both not being used to provide non-volatile data storage to cache flush operations that store dirty pages of data flushed from the cache of any node, and that are also no longer indicated as currently being quarantined by the allocation history of any node.

In some embodiments, each node in the multi-node data storage system initially indicates, in its allocation history, that each set of physical blocks that is allocated to the node to provide non-volatile data storage to store dirty pages of user data flushed from the cache of the node is non-quarantined at the time the set of physical blocks is allocated to the node.

In some embodiments, each node in the multi-node data storage system modifies its allocation history to indicate that each individual set of physical blocks previously allocated to the node to provide non-volatile data storage to store dirty pages of user data flushed from the cache of the node is quarantined instead of non-quarantined prior to removing the indication of that set of physical blocks from its allocation history.

In some embodiments, each node in the multi-node data storage system modifies its allocation history to indicate that an individual set of physical blocks previously allocated to the node to provide non-volatile data storage to store dirty pages of user data flushed from the cache of the node is quarantined instead of non-quarantined responsive to the node having used all of the free physical blocks contained in the set of physical blocks to store dirty pages of user data flushed from the cache of the node.

In some embodiments, the allocation history of each node in the multi-node data storage system includes a first set of entries storing indications of the non-quarantined sets of physical blocks that are currently allocated to the node and are currently being used to provide non-volatile data storage to store dirty pages of user data flushed from the cache of the node. In such embodiments, the allocation history of each node in the multi-node data storage system also includes a second set of entries storing indications of the quarantined sets of physical blocks that are no longer allocated to the node and are not currently being used to provide non-volatile data storage to cache flush operations that store dirty pages of user data flushed from the cache of the node.

In some embodiments, each node in the multi-node data storage system initially indicates in its allocation history that each set of physical blocks that is allocated to the node to provide non-volatile data storage to store dirty pages of user data flushed from the cache of the node is non-quarantined at the time the set of physical blocks is allocated to the node by initially storing an indication of each set of physical blocks that is allocated to the node to provide non-volatile data storage to store dirty pages of user data flushed from the cache of the node within the first set of entries in its allocation history at the time the set of physical blocks is allocated to the node.

In some embodiments, each node in the multi-node data storage system modifies its allocation history to indicate that each set of physical blocks previously allocated to the node to provide non-volatile data storage to store dirty pages of user data flushed from the cache of the node is quarantined prior to removing the indication of the set of physical blocks from its allocation history by moving the indication of the set of physical blocks from the first set of entries in the allocation history of the node to the second set of entries in the allocation history of the node prior to removing the indication of the set of physical blocks from the allocation history of the node.

In some embodiments, each node in the multi-node data storage system delays removal of an individual indication of a set of physical blocks stored in the second set of entries in the allocation history of the node from the second set of entries in the allocation history of the node until after detecting that a predetermined number of indications of other sets physical blocks have been moved from the first set of entries in the allocation history of the node to the second set of entries in the allocation history of the node after the indication of the set of physical blocks was moved to the second set of entries in the allocation history of the node from the first set of entries in the allocation history of the node. In this way, the disclosed technology may prevent the allocation of a set of physical blocks that was previously allocated to a node to any other node until after a period of time has expired during which the set of physical blocks is indicated as quarantined. The period of time during which the set of physical blocks is quarantined may be equal to an amount of a time elapsed after the indication of the set of nodes was moved to the second set of entries in the allocation history of the node, during which free non-volatile data storage contained in some predetermined number of other sets of physical blocks was subsequently completely consumed by the node, resulting in those other sets of physical blocks becoming quarantined, such that the indications of those other sets of physical blocks were moved to the second set of entries in the allocation history of the node.

Embodiments of the disclosed technology may provide significant advantages over previous technologies. For example, by supporting the allocation of sets of physical blocks to any one of the multiple nodes in a multi-node data storage system, in order to store dirty pages of user data flushed from their node-specific caches, the disclosed technology eliminates the need for static assignment of sets of physical blocks to specific individual nodes. As a result, the disclosed technology is flexible and efficient, and advantageous in terms of optimal system resource utilization under multiple different and/or dynamically changing operational conditions. In another example of a potential advantage, the disclosed technology may prevent a set of physical data blocks from being reallocated until after the non-volatile data storage in the set of physical blocks has been consumed and after the set of physical blocks has been quarantined. This allows cache flush operations using the non-volatile data storage provided from the set of physical blocks to complete before the set of physical blocks is reallocated, thus avoiding contention for non-volatile data storage within the set of physical blocks between nodes. By delaying the reallocation of a set of physical blocks from a node to any other node until after the set of physical blocks has been quarantined for some period time after the node stops providing the non-volatile data storage from the set of the set of physical blocks to cache flush operations that store dirty pages of user data that are flushed from its cache, the disclosed technology may prevent the reallocation of the set of physical blocks until after the completion of such outstanding cache flush operations that are currently using the non-volatile data storage previously provided from the set of physical blocks.

BRIEF DESCRIPTION OF THE DRAWINGS

The objects, features and advantages of the disclosed technology will be apparent from the following description of embodiments, as illustrated in the accompanying drawings in which like reference numbers refer to the same parts throughout the different views. The drawings are not necessarily to scale, emphasis instead being placed upon illustrating the principles of the disclosed technology.

DETAILED DESCRIPTION

Embodiments of the invention will now be described with reference to the figures. The embodiments described herein are provided only as examples, in order to illustrate various features and principles of the disclosed technology, and the invention is broader than the specific embodiments described herein.

Embodiments of the technology disclosed herein may provide improvements over previous technologies by maintaining, for each node in a multi-node data storage system, an allocation history indicating sets of physical blocks of non-volatile data storage previously allocated to the node to store dirty pages of user data flushed from a cache of the node. The allocation history maintained by the disclosed technology for each node in the data storage system indicates the non-quarantined sets of physical blocks that are currently allocated to the node. The non-quarantined sets of physical blocks allocated to the node are currently being used to provide non-volatile data storage to cache flush operations performed by the node to store dirty pages of user data flushed from the cache of the node. The allocation history for each node also indicates a number of quarantined sets of physical blocks that are no longer allocated to the node. The quarantined sets of physical blocks are not currently being used to provide non-volatile data storage to cache flush operations performed by the node to store dirty pages of user data flushed from the cache of the node. Requests from the nodes of the multi-node data storage system for allocation of sets of physical blocks to store dirty pages of user data flushed from their caches are processed by the disclosed technology by reading all the allocation histories maintained by the nodes of the multi-node data storage system, and by preventing allocation of any sets of physical blocks that are indicated as non-quarantined by any of the allocation histories, and also by preventing allocation of any sets of physical blocks that are indicated as quarantined by any of the allocation histories. Advantageously, only sets of physical blocks can be allocated that are both not being used to provide non-volatile data storage to cache flush operations that store dirty pages of data flushed from the cache of any node, and that are also no longer indicated as quarantined by the allocation history of any node, thus preventing reallocation of a set of physical blocks prior to completion of any flush operations using non-volatile data storage provided from the set of physical blocks.

Figure 1:
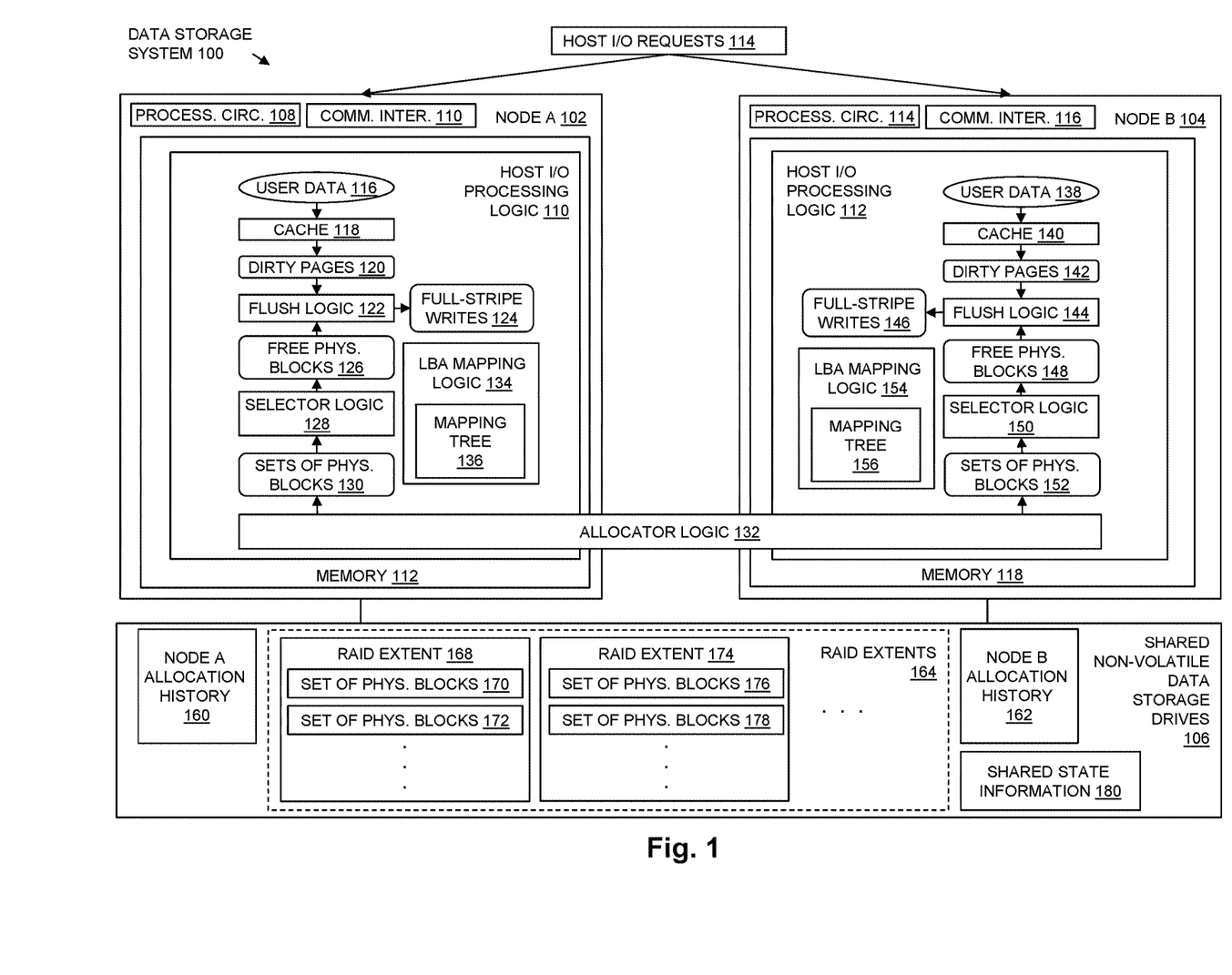
FIG. 1 is a block diagram showing an example of a multi-node data storage system in which an example of the disclosed technology is embodied.

FIG. 1 is a block diagram showing an operational environment for the disclosed technology, including an example of a multi-node Data Storage System 100 in which the disclosed technology is embodied. The Data Storage System 100 processes Host I/O Requests 114 received from some number of physical and/or virtual host computing devices, referred to as "hosts". The hosts may access data storage provided by Data Storage System 100 over one or more networks, such as a local area network (LAN), and/or a wide area network (WAN) such as the Internet, etc.

Data Storage System 100 includes multiple nodes, sometimes referred to as "storage processors", each of which concurrently processes host I/O requests directed to the Data Storage System 100, in what is sometimes referred to as an "Active/Active" storage system configuration. In the example of FIG. 1, Data Storage System 100 includes two nodes, i.e. Node A 102 and Node B 104. Those skilled in the art will recognize that the disclosed technology is not limited to embodiments with any specific number of nodes, and the disclosed technology may alternatively be embodied in data storage systems having more than two nodes.

Each node in Data Storage System 100 may be communicably coupled to the hosts that issue Host I/O Requests 114, and also to the Shared Non-Volatile Data Storage Drives 106, e.g. through one or more communication interfaces such as Communication Interfaces 110 in Node A 102 and Communication Interfaces 116 in Node B 104. No particular hardware configuration is required, and each node may be embodied as any specific type of device that is capable of processing Host I/O Requests 114 that it receives from the hosts (e.g. I/O read and I/O write requests, etc.), and persistently storing and retrieving user data indicated by the Host I/O Requests 114.

Shared Non-Volatile Data Storage Drives 106 may include physical data storage drives such as solid state drives, magnetic disk drives, hybrid drives, optical drives, and/or other specific types of drives. Shared Non-Volatile Data Storage Drives 106 may be directly physically connected to and/or contained within the nodes of Data Storage System 100, and/or may be communicably connected to the nodes of Data Storage System 100 by way of one or more networks.

A memory in each node stores program code that is executable on processing circuitry of the node. In the example of FIG. 1, Memory 112 in Node A 102 stores program code that is executable on Processing Circuitry 108, and Memory 118 in Node B 124 stores program code that is executable on Processing Circuitry 114. The memory in each node may include volatile memory, e.g. DRAM. The processing circuitry in each node may include or consist of one or more microprocessors, e.g. central processing units (CPUs), multi-core processors, chips and/or assemblies, and associated circuitry.

The processing circuitry and memory in each node together form control circuitry, which is configured and arranged to carry out various methods and functions as described herein. The memory in each node stores a variety of software components that may be provided in the form of executable program code. For example, Memory 112 may include software components such as Host I/O Processing Logic 110, and Memory 118 may include software components such as Host I/O Processing Logic 112. When program code in the memory of a node is executed by the processing circuitry of that node, the processing circuitry is caused to carry out the operations of the software components. Although certain software components are shown in the Figures and described herein for purposes of illustration and explanation, those skilled in the art will recognize that the nodes may include various other software components, such as an operating system, various applications, other specific processes, etc.

During operation, pages of user data indicated by write I/O requests in Host I/O Requests 114 that are received and processed by Node A 102 are shown by User Data 115. Pages of user data indicated by write I/O requests in Host I/O Requests 114 that are received and processed by Node B 104 are shown by User Data 138.

The user data indicated by Host I/O Requests 114 that is received by a specific node is initially stored in the cache of that node, before it is subsequently stored in Shared Non-Volatile Data Storage Drives 106, e.g. before it is subsequently stored within one of the RAID Extents 164.

For example, as shown in FIG. 1, User Data 116 that is received by Node A 102 is initially stored in Cache 118, before it is flushed from Cache 118 and stored into one or more of the RAID Extents 164. User Data 138 that is received by Node B 104 is initially stored in Cache 140, before it is flushed from Cache 140 and stored into one or more of the RAID Extents 164.

In some embodiments, the cache of each node may be persisted, e.g. by way of battery backed data storage or the like, and for each individual write I/O request in Host I/O Requests 114, after all the user data indicated by that write I/O request has been successfully persisted into the cache of either Node A 102 or the cache of Node B 104, Data Storage System 100 may indicate successful completion of that write I/O request to the host that issued the write I/O request (e.g. by sending an acknowledgement response message or the like to the host), advantageously without first having to perform time consuming accesses to Shared Non-Volatile Data Storage Drives 106. Caching of user data may also enable the nodes of Data Storage System 100 to promptly service received host I/O read requests directed to cached pages of user data without having to access Shared Non-Volatile Data Storage Drives 106.

Dirty pages are pages of received user data that are stored in a node's cache, but have not yet been persistently stored into the RAID Extents 164. Each dirty page may, for example, consist of four kilobytes (4 KB) of user data, and flush logic in each node performs flush operations to persistently store dirty pages of user data from the node's cache into the RAID Extents 164. For example Flush Logic 122 in Node A 102 performs flush operations to persistently store Dirty Pages 120 from Cache 118 into the RAID Extents 164, and Flush Logic 144 in Node B 104 performs flush operations to persistently store Dirty Pages 142 from Cache 140 into RAID Extents 164.

The flush logic in each node may perform full-stripe writes when performing flush operations to persistently store dirty pages of user data from the node's cache into the RAID Extents 164. For example, Flush Logic 122 may perform Full-Stripe Writes 124 to store Dirty Pages 120 into RAID Extents 164, and Flush Logic 144 may perform Full-Stripe Writes 146 to store Dirty Pages 142 into RAID Extents 164. The size of each full-stripe write performed by the flush logic in the nodes of Data Storage System 100 may be equal to the full amount of user data that can be stored in a single RAID stripe within one of the RAID Extents 164. For example, in some embodiments, each full-stripe write may be a write operation that writes two megabytes (2 MB) of dirty pages of user data to one of the RAID Extents 164, but the disclosed technology is not limited to a specific size of full-stripe write.

To support the full-stripe writes performed by the flush logic of each node, each node includes selector logic that provides the flush operations performed by the flush logic of the node with free physical blocks contained within the RAID Extents 164. The free physical blocks provided by the selector logic serve as targets of the flush operations performed by the flush logic, and are used by the flush operations to store the dirty pages of user data written by the full-stripe writes. For example, Selector Logic 128 in Node A 102 provides Flush Logic 122 of Node A 102 with Free Physical Blocks 126 to serve as targets of the flush operations performed by Flush Logic 122, and into which Dirty Pages 122 are written by Full-Stripe Writes 124. In another example, Selector Logic 150 in Node B 104 provides Flush Logic 144 of Node B 104 with Free Physical Blocks 148 to serve as targets of the flush operations performed by Flush Logic 144, and into which Dirty Pages 142 are written by Full-Stripe Writes 146.

The selector logic in each node obtains the free physical blocks of non-volatile data storage that it provides to the flush logic of the node from sets of physical blocks that are allocated to the node and provided to the selector logic by allocator logic that services requests for sets of physical blocks from all the nodes of Data Storage System 100. The free physical blocks that are provided to the flush logic are physical blocks identified within the sets of physical blocks allocated to the node that currently contain no valid user data, and are accordingly completely free to store dirty pages flushed from the node's cache. For example, Selector Logic 128 in Node A 102 obtains the Free Physical Blocks 126 that it provides to the Flush Logic 122 of Node A 102 by scanning the Sets of Physical Blocks 130 that are allocated to Node A 102. Sets of Physical Blocks 130 are provided to Selector Logic 128 by Allocator Logic 132. Allocator Logic 132 may execute on Node A 102 and/or Node B 104, and services requests for sets of physical blocks from all the nodes of Data Storage System 100. Similarly, Selector Logic 150 in Node B 104 obtains the Free Physical Blocks 148 that it provides to the Flush Logic 144 of Node B 104 by scanning the Sets of Physical Blocks 152 that are allocated to Node B 104 and provided to Selector Logic 150 by the Allocator Logic 132.

Each set of physical blocks may only be allocated to a maximum of one node in Data Storage System 100 at any given time. The current allocation state of each set of physical blocks may be stored in Shared State Information 180. For example, when a given set of physical blocks is allocated to Node A 102 (e.g. by Allocator Logic 132), the state of that set of physical blocks may be set to "ALLOCATED—NODE A". When a given set of physical blocks is allocated to Node B 104 (e.g. by Allocator Logic 132), the state of that set of physical blocks may be set to "ALLOCATED—NODE B". When a set of physical blocks is available for allocation to one of the nodes in Data Storage System 100, it may, for example, have a state of "SCANNABLE". Allocator Logic 132 operates such that only sets of physical blocks having a state of "SCANNABLE" are allocated to either Node A 102 or Node B 104. Allocator Logic 132 also checks the contents of the allocation histories of all the nodes in Data Storage System 100 before allocating any set of physical blocks to a node, e.g. the Node A Allocation History 160 and the Node B Allocation History 162, as further described herein. In some embodiments, a set of physical blocks may at certain times be assigned one or more other specific states also indicating that the set of physical blocks is not currently available for allocation to a node to provide physical blocks of non-volatile data storage to support flush operations. For example, in some embodiments, a set of physical blocks may be assigned a state indicating that the RAID extent containing the set of physical blocks is currently being "reclaimed" by various program logic executing in the data storage system, and that therefore the set of physical blocks cannot currently be allocated to any node to provide non-volatile data storage to support flush operations. In some embodiments, a RAID extent may, for example, be reclaimed for some period of time in order for the RAID extent to temporarily serve as spare data storage, e.g. to serve as backup data storage during a RAID rebuild operation performed in the case of a drive failure. During such periods of time the sets of physical drive extents contained within that RAID extent may be assigned an allocation state indicating that they are not available for allocation to a node by the allocator logic.

Each set of physical blocks is contained within one of the RAID extents in RAID Extents 164. RAID Extents 164 may include any specific number of RAID extents. The RAID extents in RAID Extents 164 are shown for purposes of illustration by RAID Extent 168, RAID Extent 174, and so on. The disclosed technology is not limited to any specific number or size of RAID extent. For example, in some embodiments, each RAID extent provides a capacity of sixty four gigabytes (64 GB) of RAID protected non-volatile data storage. The disclosed technology is also not limited to any specific size for each set of physical blocks. In some embodiments, each 64 gigabyte RAID extent contains eight sets of physical blocks. In such embodiments, each set of physical blocks provides eight gigabytes (8 GB) of RAID protected non-volatile data storage, i.e. 4K physical blocks of 2 MB each.

For example, in some embodiments, in order to provide mapped RAID data protection for user data, host I/O processing logic and/or other program logic executing in the nodes of Data Storage System 100 divides each of the non-volatile data storage drives in Shared Non-Volatile Data Storage Drives 106 into multiple, equal size drive extents. Each drive extent consists of physically contiguous non-volatile data storage located on a single data storage drive. For example, in some configurations, each one of the non-volatile data storage drives in Shared Non-Volatile Data Storage Drives 106 may be divided into the same number of equal size drive extents of physically contiguous non-volatile storage. Various specific sizes of drive extents may be used in different embodiments. For example, in some embodiments each drive extent may have a size of 10 gigabytes. Larger or smaller drive extent sizes may be used in the alternative for specific embodiments and/or configurations.

Some or all of the drive extents created in Shared Non-Volatile Data Storage Drives 106 are organized into discrete sets of multiple drive extents. Each drive extent may only be contained within one set of drive extents. Within each individual set of drive extents, each of the drive extents is located on a different physical non-volatile data storage drive, in order to ensure correct RAID operation. Each one of the sets of drive extents is assigned and mapped to a single corresponding one of the RAID extents in RAID Extents 164, and used to store user data indicated by write operations directed to logical block addresses contained in a corresponding range of logical block addresses that is mapped to that RAID extent. For example, at least one logical unit ("LUN") of non-volatile data storage in Shared Non-Volatile Data Storage Drives 106 may be accessed by the host I/O processing logic in Node A 102 and/or Node B 104 using logical block addresses contained within the ranges of logical block addresses that are mapped to the individual RAID extents within RAID Extents 164.

The physical blocks contained in a given RAID extent are striped across the set of drive extents that are assigned and mapped to that RAID extent. Accordingly, the physical blocks in RAID Extent 168 are used to store user data written to the range of logical block addresses corresponding to RAID Extent 168, the physical blocks in RAID Extent 174 are used to store user data written to the range of logical block addresses corresponding to RAID Extent 174, and so on. Each physical block may contain multiple pages of non-volatile storage that are each mapped, e.g. by LBA (Logical Block Address) Mapping Logic 134 and/or Logical Block Mapping Logic 154, using Mapping Tree 136 and/or Mapping Tree 156, to corresponding logical block addresses within the range of logical block addresses corresponding to the RAID extent that contains the physical block. For example, in some embodiments or configurations, each physical block may include or consist of a logically contiguous chunk of non-volatile data storage that may be used to store user data, per a specific type of RAID protection provided by the RAID extent that contains the physical block. The user data written to each physical block is striped with corresponding parity information across the drive extents allocated to the RAID extent that contains that physical block.

Various specific RAID levels may be provided for individual RAID extents, i.e. for the user data written to the physical blocks contained by individual RAID extents. For example, block level striping with distributed parity error protection in 4D+1P ("four data plus one parity") RAID-5 may be provided for the physical blocks contained in one or more RAID extents. In 4D+1P RAID-5, each stripe consists of 4 data blocks and a block of parity information. When 4D+1P RAID-5 is provided for a RAID extent, at least five drive extents must be contained in the drive extent set assigned and mapped to the RAID extent, so that each one of the four data blocks and the parity information for each stripe can be stored on a different drive extent, and therefore stored on a different storage drive. Various other RAID levels may be provided, such as, for example, 4D+2P RAID-6, which provides striping with double distributed parity information that is provided on a per-stripe basis.

Each node Data Storage System 100 maintains an allocation history indicating sets of physical blocks that were previously allocated to the node to store dirty pages of user data flushed from a cache of the node. In the example of FIG. 1, Node A 102 maintains Node A Allocation History 160, and Node B 104 maintains Node B Allocation History 162.

The allocation history maintained by each node indicates a number of the sets of physical blocks previously allocated to the node that are non-quarantined. The non-quarantined sets of physical blocks are currently allocated to the node (have not yet been deallocated) and are currently being used to provide non-volatile data storage to cache flush operations that store dirty pages of user data flushed from the cache of the node. For example, Node A Allocation History 160 may indicate a number of the sets of physical blocks previously allocated to Node A 102 that are non-quarantined. The non-quarantined sets of physical blocks indicated by Node A Allocation History 160 are currently allocated to Node A 102 and are currently being used by Selector Logic 128 to provide Free Physical Blocks 126 to cache flush operations performed by Flush Logic 122 that store Dirty Pages 120 that are flushed from Cache 118. Additionally, Node B Allocation History 162 may indicate a number of the sets of physical blocks previously allocated to the node that are non-quarantined. The non-quarantined sets of physical blocks indicated by Node B Allocation History 162 are currently allocated to Node B 104 and are currently being used by Selector Logic 150 to provide Free Physical Blocks 148 to cache flush operations performed by Flush Logic 144 that store Dirty Pages 142 that are flushed from Cache 140.

For example, in some embodiments, the selector logic of each node may scan the non-quarantined sets of physical blocks indicated by the node's allocation history to identify free physical blocks (i.e. physical blocks that contain no valid user data) within those sets of physical blocks, and then pass those free physical blocks to the flush logic. In some embodiments, selector logic in each node may further operate to compact the user data stored in multiple (e.g. two) partially free physical pages (e.g. two physical pages that are only partially filled with valid user data) contained in one or more of the non-quarantined sets of physical blocks indicated by the node's allocation history into fewer (e.g. one) fully utilized physical pages (e.g. physical pages that are completely filled with user data), in order to create completely free physical pages that can be passed to the flush logic for the flush operations that perform full stripe writes.

The allocation history for each node also indicates a number of the sets of physical blocks previously allocated to the node that are quarantined sets of physical blocks. The quarantined sets of physical blocks indicated by the allocation history are no longer allocated to the node, and are not currently being used to provide non-volatile data storage to cache flush operations that store dirty pages of user data flushed from the cache of the node. For example, the Node A Allocation History 160 may also indicate some number of quarantined sets of physical blocks that currently have a state indicating that they are no longer allocated to Node A 102 (e.g. have a state equal to SCANNABLE), and are no longer being used to provide free physical blocks to Flush Logic 122 for Full-Stripe Writes 124. Further for example, the Node B Allocation History 162 may also indicate some number of quarantined sets of physical blocks that currently have a state indicating that they are no longer allocated to Node B 104 (e.g. have a state equal to SCANNABLE), and are no longer being used to provide free physical blocks to Flush Logic 144 for Full-Stripe Writes 146.

Allocator Logic 132 receives and processes requests from Node A 102 and Node B 104 (e.g. from Selector Logic 128 and Selector Logic 150 respectively) for allocation of sets of physical blocks to store dirty pages of user data flushed from their caches. For example, Allocator Logic 132 receives and processes requests from Selector Logic 128 for the allocation of sets of physical blocks to Node A 102 to store Dirty Pages 120 that are flushed from Cache 118, and from Selector Logic 150 for the allocation of sets of physical blocks to Node B 104 to store Dirty Pages 142 that are flushed from Cache 140.

Allocator Logic 132 processes requests for the allocation of sets of physical blocks that it receives from Node A 102 and Node B 104 by reading all the allocation histories maintained by the nodes of the Data Storage System 100, and then preventing the allocation of any set of physical blocks that is indicated as non-quarantined by any of the allocation histories, and also preventing allocation of any set of physical blocks that is indicated as quarantined by any of the allocation histories. For example, Allocator Logic 132 processes requests for the allocation of one or more sets of physical blocks from either Node A 102 or Node B 104 by reading Node A Allocation History 160 and Node B Allocation History 162, and preventing allocation of any of the sets of physical blocks that are indicated as non-quarantined by either Node A Allocation History 160 or Node B Allocation History 162, and also preventing allocation of any of the sets of physical blocks that are indicated as quarantined by either Node A Allocation History 160 or Node B Allocation History 162. Accordingly, only sets of physical blocks are allocated that are not indicated as either non-quarantined or quarantined by either Node A Allocation History 160 or Node B Allocation History 162, and accordingly only sets of physical blocks are allocated that are both i) not currently being used to provide non-volatile data storage to cache flush operations that store dirty pages of data flushed from the cache of any node (non-quarantined), and ii) not indicated as quarantined by the allocation history of any node.

In some embodiments, each node Data Storage System 100 initially indicates in its allocation history that each set of physical blocks that is allocated to the node to provide non-volatile data storage to store dirty pages of user data flushed from the cache of the node is non-quarantined at the time the set of physical blocks is allocated to the node. For example, Selector Logic 128 and/or Allocator Logic 132 may initially indicate in Node A Allocation History 160 that each set of physical blocks in the Sets of Physical Blocks 130 that is allocated to Node A 102 to provide Free Physical Blocks 126 to Flush Logic 122 to store Dirty Pages 120 is non-quarantined at the time the set of physical blocks is allocated to Node A 102. Further for example, Selector Logic 150 and/or Allocator Logic 132 may initially indicate in Node B Allocation History 162 that each set of physical blocks in the Sets of Physical Blocks 152 that is allocated to Node B 104 to provide Free Physical Blocks 148 to Flush Logic 144 to store Dirty Pages 142 is non-quarantined at the time the set of physical blocks is allocated to Node B 104.

In some embodiments, each node in Data Storage System 100 modifies its allocation history to indicate that each individual set of physical blocks previously allocated to the node to provide non-volatile data storage to store dirty pages of user data flushed from the cache of the node is quarantined instead of non-quarantined prior to removing the indication of that set of physical blocks from its allocation history. For example, Selector Logic 128 and/or Allocator Logic 132 may modify Node A Allocation History 160 to indicate that each individual set of physical blocks previously allocated to Node A 102 to provide Free Physical Blocks 126 to store Dirty Pages 120 flushed from Cache 118 is quarantined instead of non-quarantined prior to removing the indication of that set of physical blocks from Node A Allocation History 160. Further for example, Selector Logic 150 and/or Allocator Logic 132 may modify Node B Allocation History 162 to indicate that each individual set of physical blocks previously allocated to Node B 104 to provide Free Physical Blocks 148 to store Dirty Pages 142 flushed from Cache 140 is quarantined instead of non-quarantined prior to removing the indication of that set of physical blocks from Node B Allocation History 162.

In some embodiments, each node in Data Storage System 100 modifies its allocation history to indicate that an individual set of physical blocks previously allocated to the node to provide non-volatile data storage to store dirty pages of user data flushed from the cache of the node is quarantined instead of non-quarantined responsive to the node having used all of the free physical blocks contained in the set of physical blocks to store dirty pages of user data flushed from the cache of the node. For example, for each set of physical blocks previously allocated to Node A 102 to provide Free Physical Blocks 126 to store Dirty Pages 120 flushed from Cache 118, Selector Logic 128 and/or Allocator Logic 132 may modify Node A Allocation History 160 to indicate that the set of physical blocks is quarantined instead of non-quarantined responsive to Selector Logic 128 having provided all the free physical blocks contained in the set of physical blocks to Flush Logic 122 to store Dirty Pages 120 flushed from the Cache 118. In another example, for each set of physical blocks previously allocated to Node B 104 to provide Free Physical Blocks 148 to store Dirty Pages 142 flushed from Cache 140, Selector Logic 150 and/or Allocator Logic 132 may modify Node B Allocation History 162 to indicate that the set of physical blocks is quarantined instead of non-quarantined responsive to Selector Logic 150 having provided all the free physical blocks contained in the set of physical blocks to Flush Logic 144 to store Dirty Pages 142 flushed from the Cache 140.

In some embodiments, the allocation history of each node in Data Storage System 100 includes a first set of entries storing indications of the non-quarantined sets of physical blocks that are currently allocated to the node and are currently being used to provide non-volatile data storage to store dirty pages of user data flushed from the cache of the node. For example, Node A Allocation History 160 may include a first set of entries storing indications of the non-quarantined sets of physical blocks that are currently allocated to Node A 102 and are currently being used to provide Free Physical Blocks 126 to Flush Logic 122 store Dirty Pages 120 of user data flushed from Cache 118. In another example, Node B Allocation History 162 may include a first set of entries storing indications of the non-quarantined sets of physical blocks that are currently allocated to Node B 104 and are currently being used to provide Free Physical Blocks 148 to Flush Logic 144 to store Dirty Pages 142 of user data flushed from Cache 140. In such embodiments, the allocation history of each node in Data Storage System 100 further includes a second set of entries storing indications of the quarantined sets of physical blocks that are no longer allocated to the node and are not currently being used to provide non-volatile data storage to cache flush operations that store dirty pages of user data flushed from the cache of the node. For example, Node A Allocation History 160 may include a second set of entries storing indications of the quarantined sets of physical blocks that are no longer allocated to Node A 102 and are not currently being used to provide Free Physical Blocks 126 to Flush Logic 122 to store Dirty Pages 120 of user data flushed from Cache 118. In another example, Node B Allocation History 162 may include a second set of entries storing indications of the quarantined sets of physical blocks that are no longer allocated to Node B 104 and are not currently being used to provide Free Physical Blocks 148 to Flush Logic 144 to store Dirty Pages 142 of user data flushed from Cache 140.

In some embodiments, each node in Data Storage System 100 initially indicates in its allocation history that each set of physical blocks that is allocated to the node to provide non-volatile data storage to store dirty pages of user data flushed from the cache of the node is non-quarantined at the time the set of physical blocks is allocated to the node by initially storing an indication of each set of physical blocks that is allocated to the node to provide non-volatile data storage to store dirty pages of user data flushed from the cache of the node within the first set of entries in its allocation history at the time the set of physical blocks is allocated to the node. For example, Selector Logic 128 and/or Allocator Logic 132 may initially indicate in Node A Allocation History 160 that each set of physical blocks in Sets of Physical Blocks 130 that is allocated to Node A 102 to provide Free Physical Blocks 126 to Flush Logic 122 to store Dirty Pages 120 of user data flushed from Cache 118 is non-quarantined at the time the set of physical blocks is allocated to Node A 102 by initially storing an indication of each set of physical blocks that is allocated to Node A 102 to provide Free Physical Blocks 126 to Flush Logic 122 to store Dirty Pages 120 of user data flushed from Cache 118 within the first set of entries in Node A Allocation History 160 at the time the set of physical blocks is allocated to Node A 102. In another example, Selector Logic 150 and/or Allocator Logic 132 may initially indicate in Node B Allocation History 162 that each set of physical blocks in Sets of Physical Blocks 152 that is allocated to Node B 104 to provide Free Physical Blocks 148 to Flush Logic 144 to store Dirty Pages 142 of user data flushed from Cache 140 is non-quarantined at the time the set of physical blocks is allocated to Node B 104 by initially storing an indication of each set of physical blocks that is allocated to Node B 104 to provide Free Physical Blocks 148 to Flush Logic 144 to store Dirty Pages 142 of user data flushed from Cache 140 within the first set of entries in Node B Allocation History 162 at the time the set of physical blocks is allocated to Node B 104.

In some embodiments, each node in Data Storage System 100 modifies its allocation history to indicate that each set of physical blocks previously allocated to the node to provide non-volatile data storage to store dirty pages of user data flushed from the cache of the node is quarantined prior to removing the indication of the set of physical blocks from its allocation history by moving the indication of the set of physical blocks from the first set of entries in the allocation history of the node to the second set of entries in the allocation history of the node prior to removing the indication of the set of physical blocks from the allocation history. For example, Selector Logic 128 and/or Allocator Logic 132 may modify Node A Allocation History 160 to indicate that each set of physical blocks in Sets of Physical Blocks 130 previously allocated to Node A 102 to provide Free Physical Blocks 126 to Flush Logic 122 to store Dirty Pages 120 of user data flushed from the Cache 118 is quarantined prior to removing the indication of the set of physical blocks from Node A Allocation History 160 by moving the indication of the set of physical blocks from the first set of entries in Node A Allocation History 160 to the second set of entries in Node A Allocation History 160 prior to removing the indication of the set of physical blocks from Node A Allocation History 160. In another example, Selector Logic 150 and/or Allocator Logic 132 may modify Node B Allocation History 162 to indicate that each set of physical blocks in Sets of Physical Blocks 152 previously allocated to Node B 104 to provide Free Physical Blocks 148 to Flush Logic 144 to store Dirty Pages 142 of user data flushed from the Cache 140 is quarantined prior to removing the indication of the set of physical blocks from Node B Allocation History 162 by moving the indication of the set of physical blocks from the first set of entries in Node B Allocation History 162 to the second set of entries in Node B Allocation History 162 prior to removing the indication of the set of physical blocks from Node B Allocation History 162.

In some embodiments, each node in Data Storage System 100 delays removal of an individual indication of a set of physical blocks stored in the second set of entries in the allocation history of the node from the second set of entries in the allocation history of the node until detecting that a predetermined number of indications of other sets physical blocks have been moved from the first set of entries in the allocation history of the node to the second set of entries in the allocation history of the node after the indication of the set of physical blocks was moved to the second set of entries in the allocation history of the node from the first set of entries in the allocation history of the node. For example, Selector Logic 126 and/or Allocator Logic 132 may delay removal of an individual indication of a set of physical blocks stored in the second set of entries in Node A Allocation History 160 from the second set of entries in Node A Allocation History 160 until detecting that a predetermined number of indications of other sets physical blocks (e.g. 2) have been moved from the first set of entries in Node A Allocation History 160 to the second set of entries in Node A Allocation History 160 after the time at which the indication of the set of physical blocks was moved to the second set of entries in Node A Allocation History 160 from the first set of entries in Node A Allocation History 160. In another example, Selector Logic 150 and/or Allocator Logic 132 may delay removal of an individual indication of a set of physical blocks stored in the second set of entries in Node B Allocation History 162 from the second set of entries in Node B Allocation History 162 until detecting that a predetermined number of indications of other sets physical blocks (e.g. 2) have been moved from the first set of entries in Node B Allocation History 162 to the second set of entries in Node B Allocation History 162 after the time at which the indication of the set of physical blocks was moved to the second set of entries in Node B Allocation History 162 from the first set of entries in Node B Allocation History 162.

Figure 2:
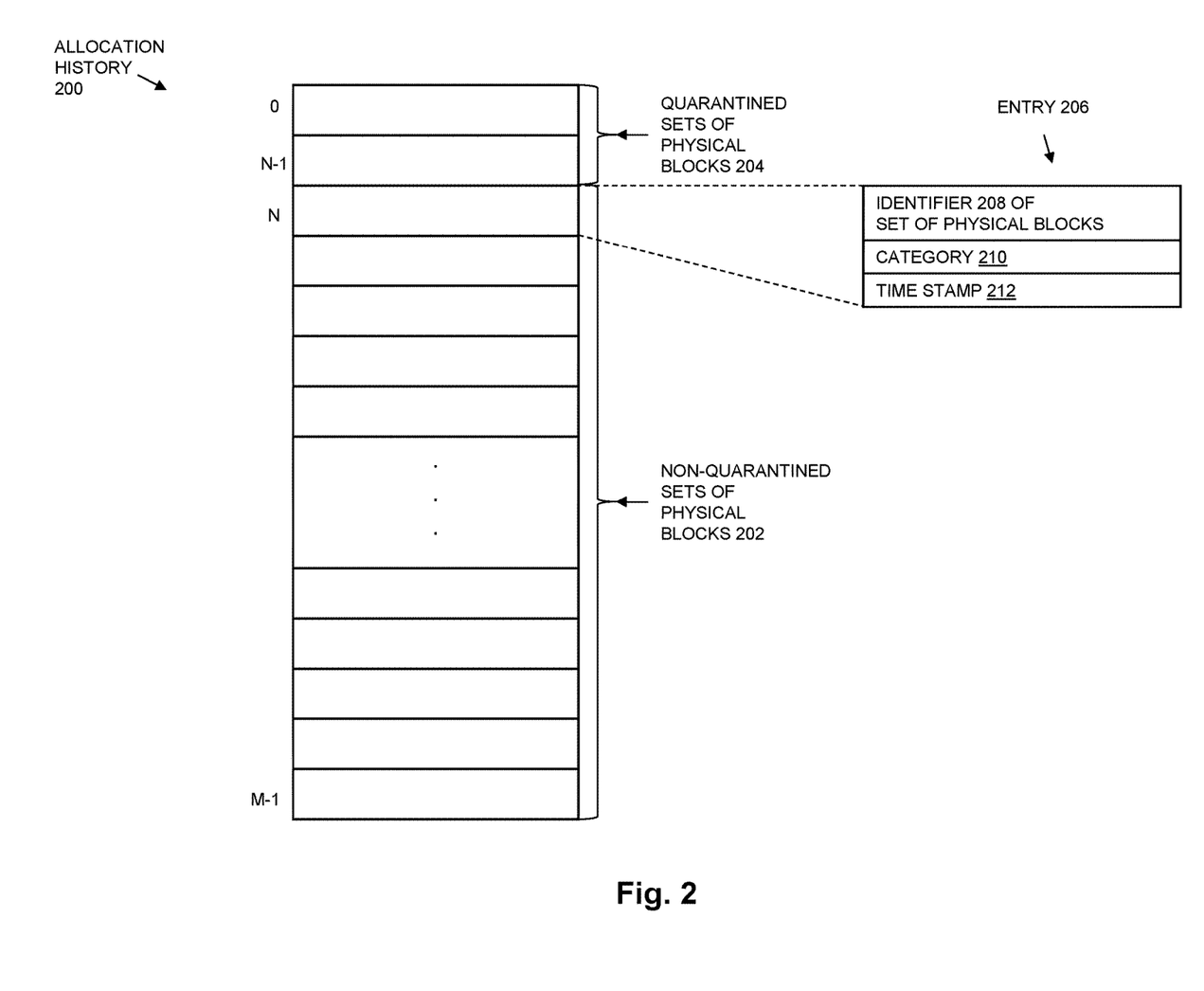
FIG. 2 is a block diagram showing an example of a node-specific allocation history storing indications of sets of physical blocks previously allocated to a node to provide non-volatile data storage to cache flush operations that store dirty pages of user data flushed from the cache of the node.

FIG. 2 is a block diagram showing an example of a node-specific allocation history, Allocation History 200. Allocation History 200 stores indications of sets of physical blocks previously allocated to a corresponding node in a multi-node data storage system to provide non-volatile data storage (e.g. free physical blocks) to cache flush operations that store dirty pages of user data flushed from the cache of the node. As shown in the example of FIG. 2, Allocation History 200 is made up of M slots, each of which is operable to store an individual entry. Each entry in Allocation History 200 indicates a single set of physical blocks that was previously allocated to the corresponding node. Allocation History 200 includes a first set of entries, e.g. Non-Quarantined Sets Physical Blocks 202, in which each entry stores an indication (e.g. a unique identifier) of a non-quarantined set of physical blocks that is currently allocated to the corresponding node, and that is currently being used to provide non-volatile data storage (e.g. free physical blocks) to the flush operations performed by the flush logic of the node to store dirty pages of user data flushed from the cache of the node. Allocation History 200 further includes a second set of entries, e.g. Quarantined Sets of Physical Blocks 204, in which each entry stores an indication (e.g. a unique identifier) of a quarantined set of physical blocks that is no longer allocated to the corresponding node and is not currently being used to provide non-volatile data storage (e.g. free physical blocks) to cache flush operations performed by the flush logic of the node that store dirty pages of user data flushed from the cache of the node.

In the example of FIG. 2, the size of the Quarantined Sets of Physical Blocks 204 ("N") is two entries. Accordingly, after an indication of a set of physical blocks is moved from the Non-Quarantined Sets of Physical Blocks 202 to the Quarantined Sets of Physical Blocks 204 (e.g. after all the free physical blocks in the set of physical blocks have been passed to flush logic to store dirty pages of user data flushed from the cache of the node), removal of the indication of that set of physical blocks from the Quarantined Sets of Physical Blocks 204 (and accordingly from the Allocation History 200) is delayed until after indications of two more sets of physical blocks are subsequently moved from Non-Quarantined Sets of Physical Blocks 202 to Quarantined Sets of Physical Blocks 204, e.g. after all the free physical blocks from two other sets of physical blocks have been passed to flush logic to store dirty pages of user data flushed from the cache of the node. Accordingly, in the example of FIG. 2, the predetermined number of indications of other sets physical blocks that are subsequently moved from the Non-Quarantined Sets of Physical Blocks 202 to the Quarantined Sets of Physical Blocks 204 before an indication of a set of physical blocks previously moved to the Quarantined Sets of Physical Blocks 204 is removed from Allocation History 200 is two, which is also the number N of entries in the Quarantined Sets of Physical Blocks 204. Those skilled in the art will recognize that the disclosed technology is not limited to embodiments in which the predetermined number of indications of other sets physical blocks that are subsequently moved from the Non-Quarantined Sets of Physical Blocks 202 to the Quarantined Sets of Physical Blocks 204 before an indication of a set of physical blocks previously moved to the Quarantined Sets of Physical Blocks 204 is removed from Allocation History 200 is equal to two. Other predetermined numbers of indications of other sets of physical blocks that are subsequently moved from the Non-Quarantined Sets of Physical Blocks 202 to the Quarantined Sets of Physical Blocks 204 before an indication of a set of physical blocks previously moved to the Quarantined Sets of Physical Blocks 204 is removed from the Allocation History 200 may be used in the alternative, and accordingly other numbers of entries in the Quarantined Sets of Physical Blocks 204 may also be used in the alternative, i.e. N may equal numbers other than two.

An example of the contents of each entry stored in Allocation History 200 is shown by Entry 206. Entry 206 includes an Identifier 208 that is a unique identifier of the set of physical blocks indicated by the Entry 206. Entry 206 further includes a Category 210 of the set of physical blocks indicated by Entry 206. Category 210 may indicate an attribute of the set of physical blocks indicated by the Entry 206. For example, Category 210 may indicate that the set of physical blocks indicated by Entry 206 has a relatively large number of free physical blocks, or a large number of physical blocks with low utilization, or some other attribute of the set of physical blocks indicated by Entry 206. Entry 206 may further include a Time Stamp 212 indicating a time at which the Entry 206 was added to Allocation History 200.

In some embodiments, the maximum number of slots operable to store entries in Allocation History 200 may be dynamically adjusted. For example, each time an entry is moved from the Non-Quarantined Sets of Physical Blocks 202 to the Quarantined Sets of Physical Blocks 204, the state of the set of physical blocks indicated by that entry may be changed from ALLOCATED TO NODE A or ALLOCATED TO NODE B to SCANNABLE. Each time the state of a set of physical blocks is changed to SCANNABLE, the maximum number of slots M that can store entries in Allocation History 200 may be adjusted to be the minimum of i) a predetermined value (e.g. 128) and ii) a predetermined percentage (¼) of the total number of sets of physical blocks having the SCANNABLE state.

In some embodiments, the total number of sets of physical blocks having the SCANNABLE state may be decreased when one or more sets of physical blocks are assigned a state other than SCANNABLE indicating that the RAID extent containing those physical blocks is currently being "reclaimed" by various program logic executing in the data storage system. In such circumstances, the maximum number of slots in Allocation History 200 that can store entries may be adjusted as described above. In the case where Allocation History 200 in one of the nodes contains more entries than the newly calculated maximum number of slots, one or more entries may be removed from Allocation History 200 indicating sets of physical blocks having relatively few free physical blocks, and/or relatively few physical blocks having low utilization, until the number of entries in Allocation History 200 is equal to the newly calculated maximum number of slots.

In some embodiments, an empty slot may also be maintained continuously in Allocation History 200 to store a newly entry added to Allocation History 200.

Figure 3:
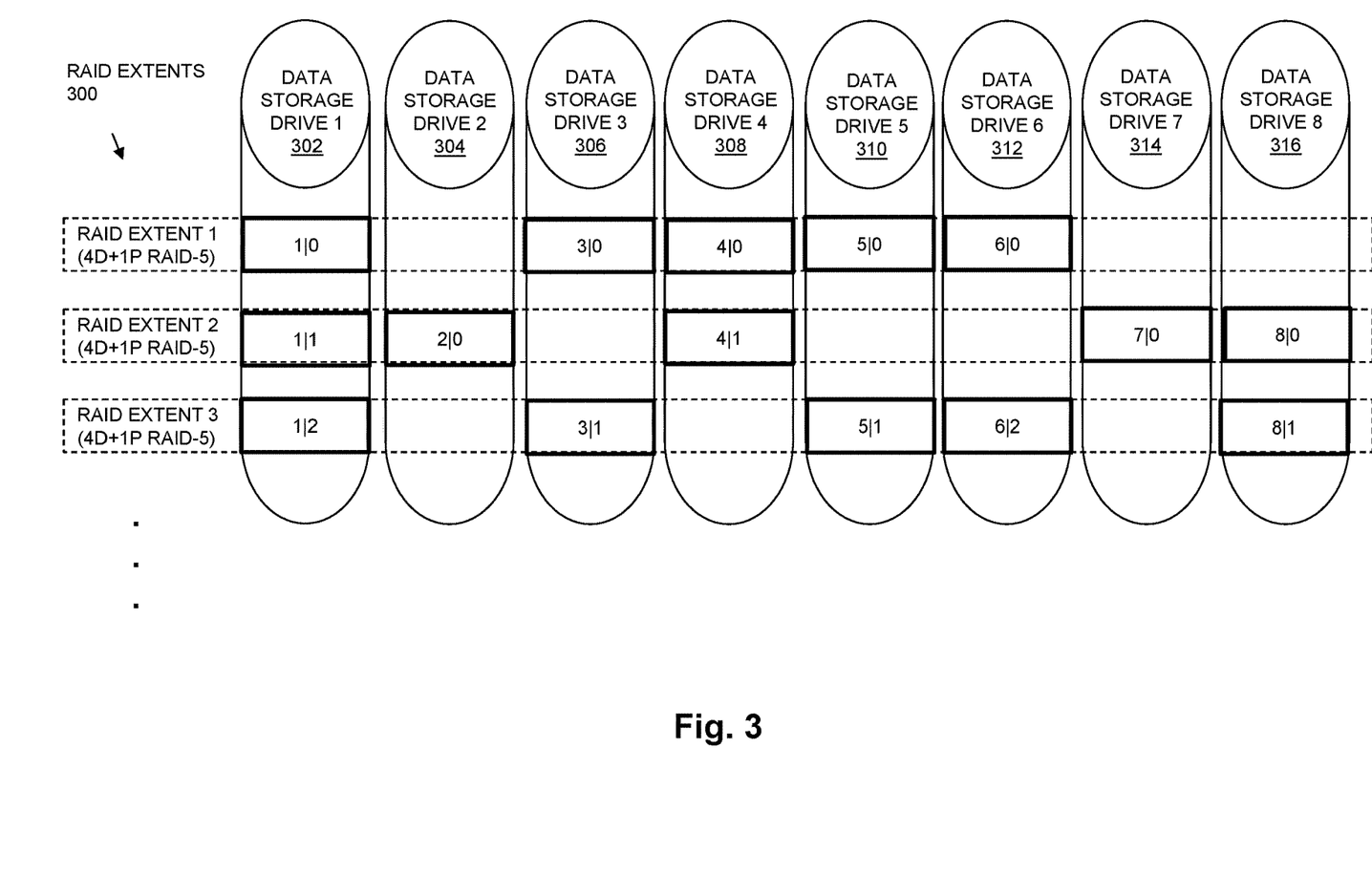
FIG. 3 is a block diagram showing an example of RAID (Redundant Array of Independent Disks) extents in some embodiments.

FIG. 3 is a block diagram showing an example of RAID (Redundant Array of Independent Disks) extents provided using mapped RAID in some embodiments. FIG. 3 is a block diagram showing an example of sets of drive extents that are assigned and mapped to individual RAID extents within a set of RAID extents (e.g. RAID Extents 300) that are used to store user data that is written to logical block addresses within ranges of logical address spaces corresponding to each RAID extent. In the example of FIG. 3, RAID Extents 300 include a RAID Extent 1, RAID Extent 2, and RAID Extent 3, and some number of other RAID extents. In the example of FIG. 3, each of the RAID extents in RAID Extents 300 provides the same level of RAID protection, e.g. 4D+1P RAID-5 level RAID protection. Other RAID levels may be provided in the alternative. Further in the example of FIG. 3, for purposes of concise illustration the drive extents are shown mapped to the RAID extents from eight non-volatile data storage drives, shown by Storage Drive 1 302, Storage Drive 2 304, Storage Drive 3 306, Storage Drive 4 308, Storage Drive 5 310, Storage Drive 6 312, Storage Drive 7 314, and Storage Drive 8 316. Any specific number of non-volatile data storage drives may be used in the alternative. In order to provide 4D+1P RAID-5 level RAID protection, each RAID extent is mapped to a different set of five drive extents.

For example, RAID Extent 1 is mapped to a set of five drive extents including a first drive extent 1|0, which is the first drive extent in Storage Drive 1 302, a second drive extent 3|0, which is the first drive extent in Storage Drive 3 306, a third drive extent 4|0, which is the first drive extent in Storage Drive 4 308, a fourth drive extent 5|0, which is the first drive extent in Storage Drive 5 310, and a fifth drive extent 6|0, which is the first drive extent in Storage Drive 6 312.

Also for example, RAID Extent 2 is mapped to a set of five drive extents including a first drive extent 1|1, which is the second drive extent in Storage Drive 1 302, a second drive extent 2|0, which is the first drive extent in Storage Drive 2 304, a third drive extent 4|1, which is the second drive extent in Storage Drive 4 308, a fourth drive extent 7|0, which is the first drive extent in Storage Drive 7 314, and a fifth drive extent 8|0, which is the first drive extent in Storage Drive 8 316.

Further for example, RAID Extent 3 is mapped to a set of five drive extents including a first drive extent 1|2, which is the third drive extent in Storage Drive 1 302, a second drive extent 3|1, which is the second drive extent in Storage Drive 3 306, a third drive extent 5|1, which is the second drive extent in Storage Drive 5 310, a fourth drive extent 6|2, which is the third drive extent in Storage Drive 6 312, and a fifth drive extent 8|1, which is the second drive extent in Storage Drive 8 316.

Figure 4:
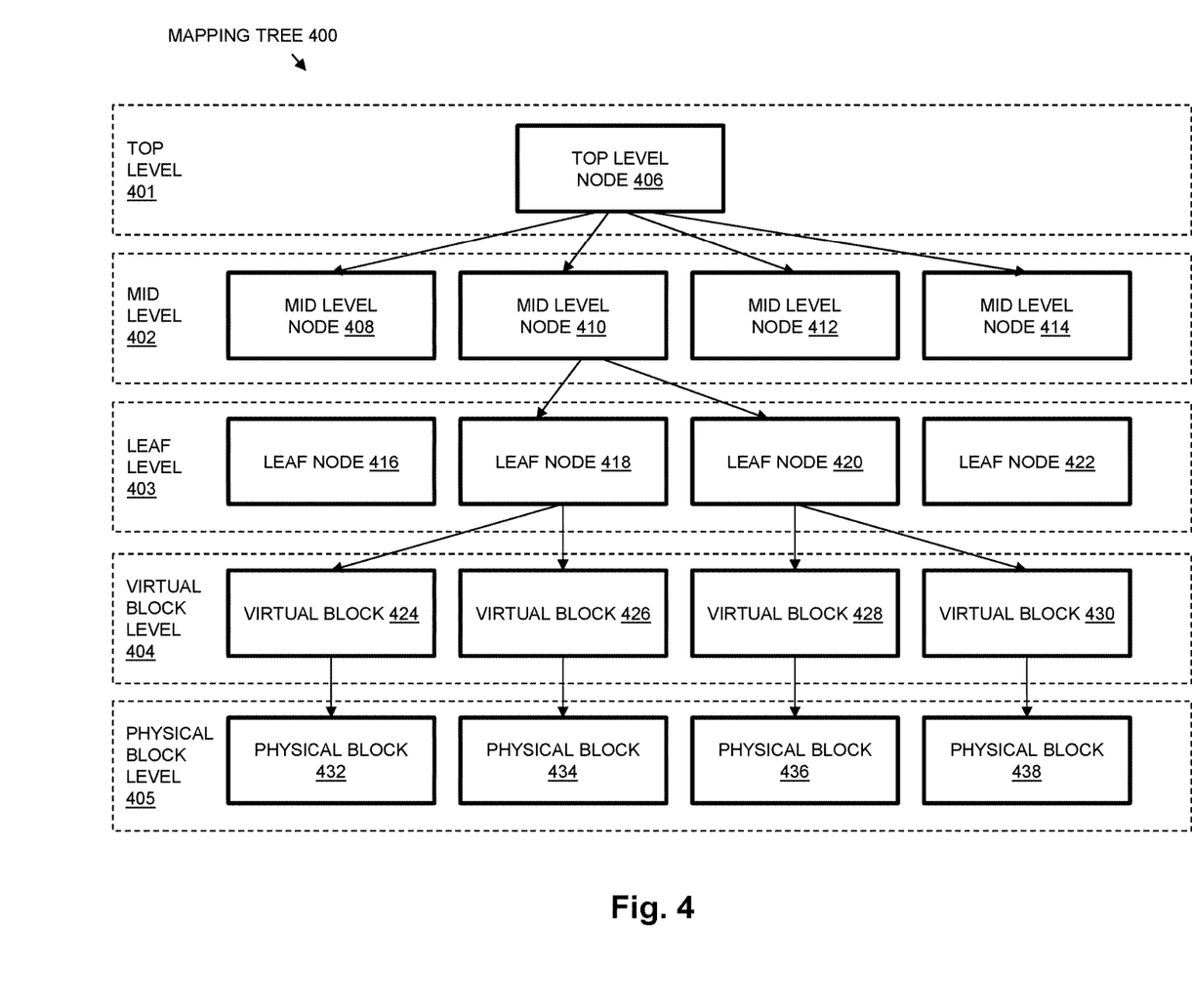
FIG. 4 is a block diagram showing an example of a mapping tree with physical blocks in some embodiments.

FIG. 4 is a block diagram showing an example of a mapping tree indicating physical blocks in some embodiments. In some embodiments, each dirty page may have a logical address, e.g. a logical block address (LBA). LBA mapping logic (e.g. LBA Mapping Logic 134 and/or LBA Mapping Logic 154) may be used by the host I/O processing logic in the nodes of the multi-node data storage system to translate the LBAs of individual dirty pages to locations of corresponding physical pages of non-volatile data storage in the shared non-volatile data storage drives. The LBA mapping logic may include one or more mapping trees such as Mapping Tree 400. The LBA mapping logic traverses the Mapping Tree 400 to translate the LBA of each dirty page to a corresponding physical page that is used to store that dirty page. The Mapping Tree 400 is a tree structure including multiple levels of nodes, with each node at a given level mapping a range of LBAs corresponding to that level, and containing pointers to nodes in a next lower level. Nodes at lower levels of Mapping Tree 400 map smaller ranges of LBAs. Mapping Tree 400 may terminate with a physical block layer containing physical blocks made up of the specific physical pages used to store dirty pages with corresponding LBAs. The Mapping Tree 400 shown in FIG. 4 is a simplified example provided only for purposes of explanation.

As shown in the example of FIG. 4, Mapping Tree 400 may consist of or include a tree structure having multiple levels of nodes, e.g. Top Level 401 including Top Level Node 406, Mid-Level 402 including Mid-Level Nodes 408, 410, 412, and 414, Leaf-Level 403 including Leaf-Level Nodes 416, 418, 420, and 422, Virtual Block Level 404 including Virtual Blocks 424, 426, 428, and 430, and Physical Block Level 405 including Physical Blocks 432, 434, 436, and 438. Each level above the Physical Block Level 405 stores mappings (e.g. pointers) to next lower level nodes, as follows:

Top Level 401: Each node corresponds to a logical volume, and stores mappings of the logical address space of the logical volume to one or more nodes in Mid-Level 402.

Mid-Level 402: Each node maps a corresponding segment of the logical address space of the logical volume (e.g. a range of LBAs within the logical address space) to one or more nodes in Leaf Level 403.

Leaf Level 403: Each node maps a smaller corresponding segment within the logical address space of the logical volume (e.g. a smaller range of LBAs than are mapped by each node in Mid-Level 402) to pointers contained in one or more virtual blocks in Virtual Block Level 404.

Virtual Block Level 404: Contains virtual blocks that isolate LBAs in the logical volume's logical address space from pages in the physical blocks of non-volatile data storage. Each virtual block in the Virtual Block Level 404 corresponds to a physical block of non-volatile data storage, and contains pointers to individual pages of non-volatile data storage within a corresponding physical block.

Physical Block Level 405: The level below the Virtual Block Layer 404, containing indications of physical blocks. Each physical block is a contiguous chunk of non-volatile data storage that may be used to store user data, and is made up of pages that may be indicated by pointers contained in the corresponding virtual block.

For example, each physical page may be 4 kilobytes (KBs), each physical block may be 2 megabytes (MBs), and each virtual block may contain a maximum of 512 pointers. In such an example, i) each leaf node may map 512 LBAs in a contiguous 2 megabyte (MB) segment of the logical address space of the logical volume using 512 pointers to pointers contained in virtual blocks, and ii) each virtual block may contain up to 512 pointers to 4 KB pages of non-volatile storage in a corresponding physical block. Those skilled in the art will recognize that the sizes given in the above example are only for purposes of explanation, and that the techniques described herein are not limited to any specific set of sizes. Those skilled in the art will further recognize that the number of levels and the numbers of nodes in each level shown in the simplified Mapping Tree 400 of FIG. 4 are only given for purposes of concise illustration and clear explanation, and accordingly that the disclosed technology is not limited to use with mapping trees having a specific number of levels and/or specific numbers of nodes within each level. An example of a branch of Mapping Tree 400 is shown in FIG. 4 as Mid-Level Node 410, and all of its descendants, e.g. the leaf nodes indicated by one or more pointers in Mid-Level Node 410 (e.g. Leaf Nodes 418, and 420), the virtual blocks indicated by one or more pointers in those leaf nodes (e.g. Virtual Blocks 424, 426, 428, and 430), and the physical blocks corresponding to those virtual blocks (e.g. Physical Blocks 432, 434, 436, and 438).

Figure 5:
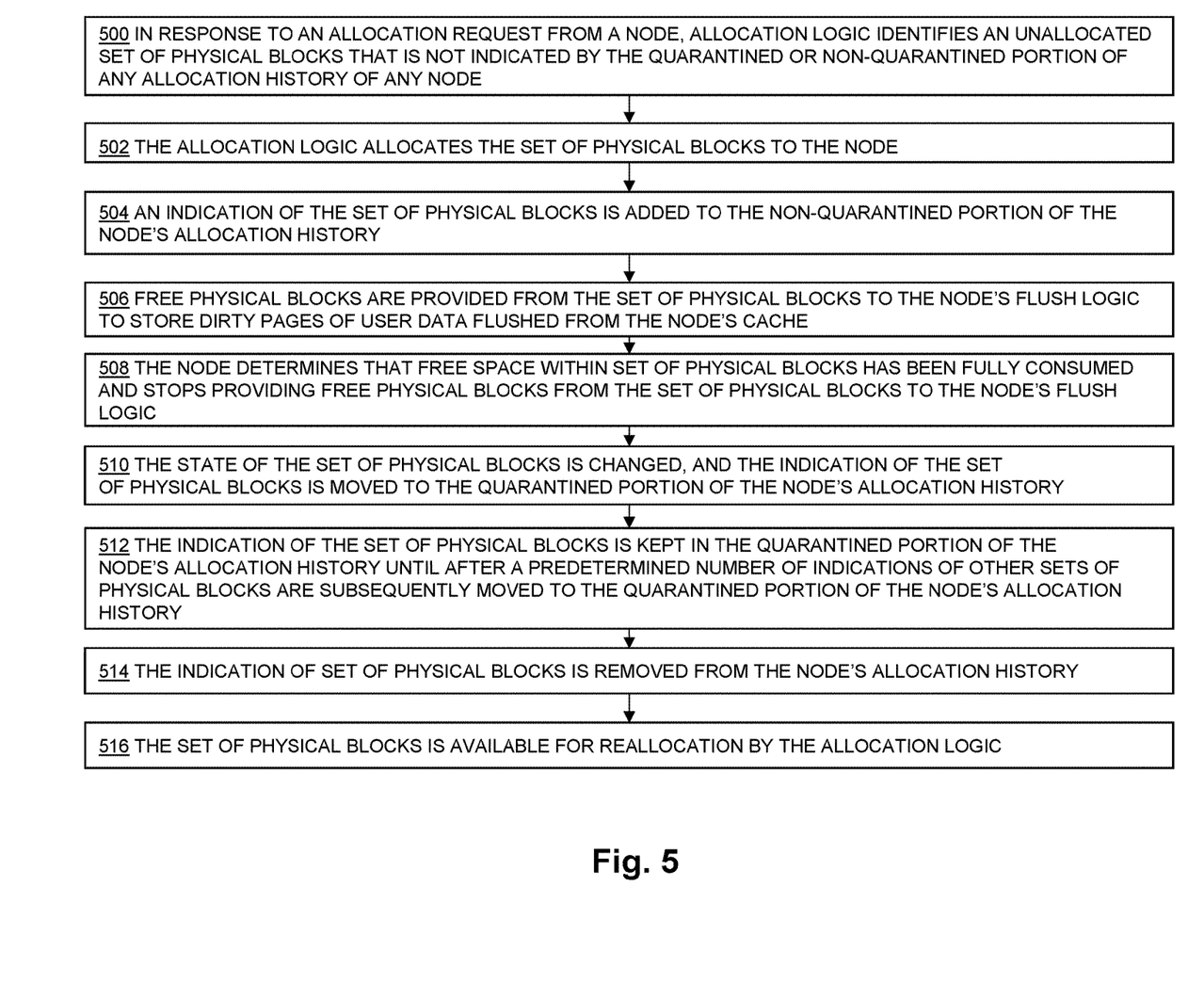
FIG. 5 is a flow chart showing an example of steps that may be performed during the operation of some embodiments.

FIG. 5 is a flow chart showing an example of steps that may be performed during the operation of some embodiments.

At step 500, in response to an allocation request received from a node in a multi-node data storage system, allocation logic reads the allocation histories of all the nodes in the multi-node data storage system and identifies an unallocated set of physical blocks that is not indicated by the quarantined or non-quarantined portion of any allocation history of any node in the multi-node data storage system.

At step 502, the allocation logic allocates the set of physical blocks identified in step 500 to the requesting node.

At step 504, an indication of set of physical blocks allocated at step 502 is added to the non-quarantined portion of the node's allocation history.

At step 506, the node begins providing free physical blocks from the set of physical blocks to the node's flush logic, for use by flush operations performed by the flush logic to store dirty pages of user data flushed from the node's cache.

At step 508, the node determines that free space within set of physical blocks has been fully consumed (e.g. determines that all free physical blocks within the set of physical blocks has been provided to the node's flush logic), and stops providing free physical blocks from the set of physical blocks to the node's flush logic.

At step 510, the state of the set of physical blocks is changed (e.g. from ALLOCATED TO NODE A or ALLOCATED TO NODE B to SCANNABLE), and the indication of the set of physical blocks is moved to the quarantined portion of the node's allocation history.

At step 512, the indication of the set of physical blocks is kept in the quarantined portion of the node's allocation history until after a predetermined number (e.g. 2) of indications of other sets of physical blocks are subsequently moved from the non-quarantined portion to the quarantined portion of the node's allocation history.

At step 514, after the predetermined number of indications of other sets of physical blocks are subsequently moved from the non-quarantined portion to the quarantined portion of the node's allocation history, the indication of the set of physical blocks is removed from the node's allocation history.

At step 516, after the indication of the set of physical blocks has been removed from the node's allocation history, the set of physical blocks is available for reallocation by the allocation logic.

Figure 6:
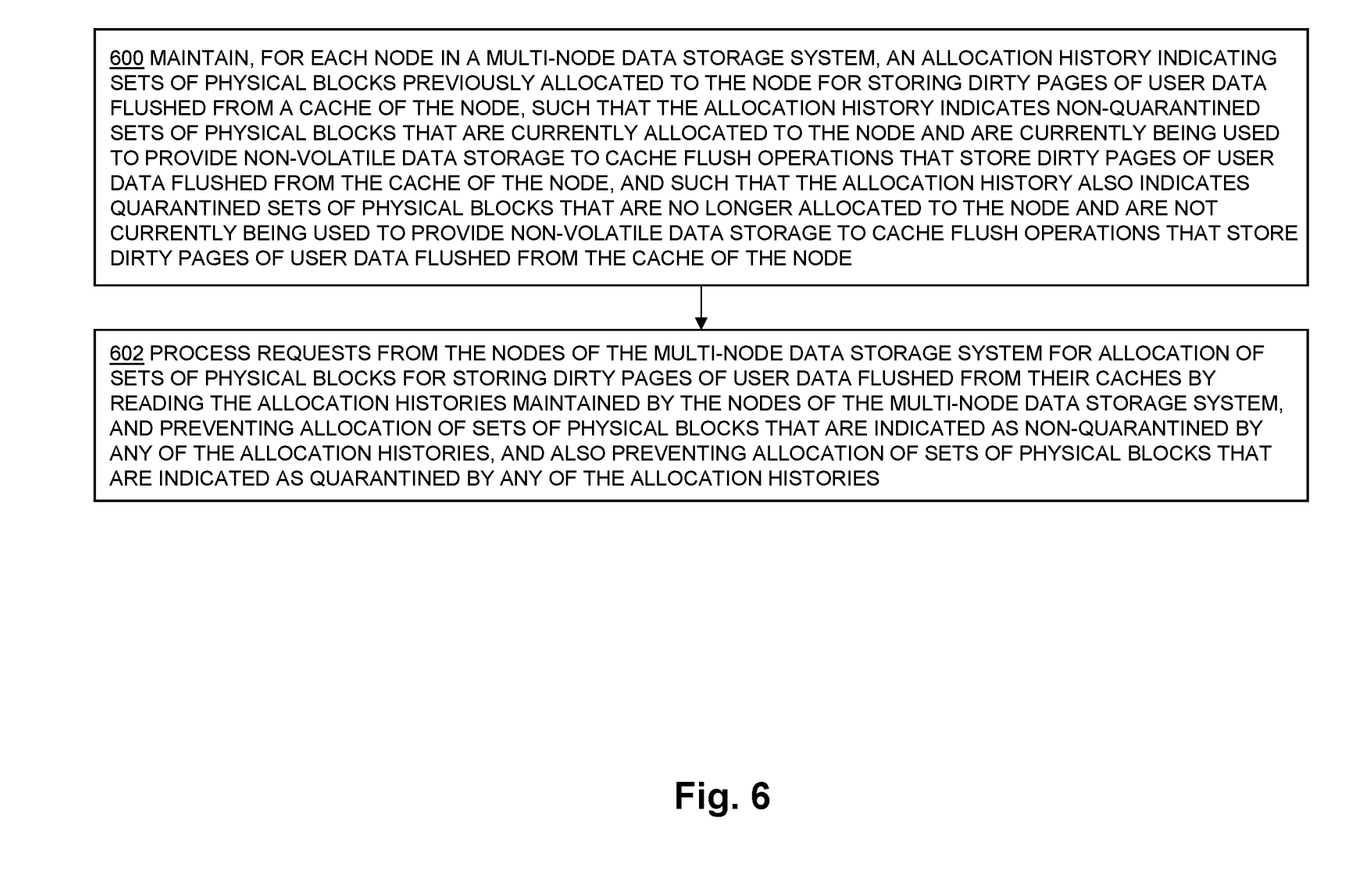
FIG. 6 is another flow chart showing another example of steps that may be performed during the operation of some embodiments.

FIG. 6 is another flow chart showing another example of steps that may be performed during the operation of some embodiments.

At step 600, the disclosed technology maintains, for each node in a multi-node data storage system, an allocation history indicating sets of physical blocks previously allocated to the node for storing dirty pages of user data flushed from a cache of the node. The allocation history for each node indicates a number of non-quarantined sets of physical blocks that are currently allocated to the node and are currently being used to provide non-volatile data storage to cache flush operations that store dirty pages of user data flushed from the cache of the node. The allocation history also indicates a number of quarantined sets of physical blocks that are no longer allocated to the node, and are not currently being used to provide non-volatile data storage to cache flush operations that store dirty pages of user data flushed from the cache of the node.

At step 602, the disclosed technology processes requests from the nodes of the multi-node data storage system for allocation of sets of physical blocks for storing dirty pages of user data flushed from their caches by reading the allocation histories maintained by the nodes of the multi-node data storage system, and preventing allocation of sets of physical blocks that are indicated as non-quarantined by any of the allocation histories, and also preventing allocation of sets of physical blocks that are indicated as quarantined by any of the allocation histories.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto programmable data processing apparatus to produce a machine, such that the instructions which execute on the programmable data processing apparatus create means for implementing the functions specified in the block or blocks. These computer program instructions may also be stored in a computer-readable memory that can direct a programmable data processing apparatus to function in a particular manner, such that the instructions stored in the computer-readable memory produce an article of manufacture including instruction means which implement the function specified in the block or blocks. The computer program instructions may also be loaded onto a programmable data processing apparatus to cause a series of operational steps to be performed on the programmable apparatus to produce a computer implemented process such that the instructions which execute on the programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method comprising:
maintaining, for each node in a multi-node data storage system, an allocation history indicating sets of physical blocks previously allocated to the node for storing dirty pages of user data flushed from a cache of the node, wherein the allocation history indicates non-quarantined sets of physical blocks that are currently allocated to the node and are currently being used to provide non-volatile data storage to cache flush operations that store dirty pages of user data flushed from the cache of the node, and wherein the allocation history also indicates quarantined sets of physical blocks that are no longer allocated to the node and are not currently being used to provide non-volatile data storage to cache flush operations that store dirty pages of user data flushed from the cache of the node; and
processing requests from the nodes of the multi-node data storage system for allocation of sets of physical blocks for storing dirty pages of user data flushed from their caches by reading the allocation histories maintained by the nodes of the multi-node data storage system, and preventing allocation of sets of physical blocks that are indicated as non-quarantined by any of the allocation histories, and also preventing allocation of sets of physical blocks that are indicated as quarantined by any of the allocation histories.

2. The method of claim 1, wherein each node in the multi-node data storage system initially indicates in its allocation history that each set of physical blocks that is allocated to the node to provide non-volatile data storage to store dirty pages of user data flushed from the cache of the node is non-quarantined at the time the set of physical blocks is allocated to the node.

3. The method of claim 2, wherein each node in the multi-node data storage system modifies its allocation history to indicate that each individual set of physical blocks previously allocated to the node to provide non-volatile data storage to store dirty pages of user data flushed from the cache of the node is quarantined instead of non-quarantined prior to removing an indication of that set of physical blocks from its allocation history.

4. The method of claim 3, wherein each node in the multi-node data storage system modifies its allocation history to indicate that an individual set of physical blocks previously allocated to the node to provide non-volatile data storage to store dirty pages of user data flushed from the cache of the node is quarantined instead of non-quarantined responsive to having used all of the free physical blocks in the set of physical blocks to store dirty pages of user data flushed from the cache of the node.

5. The method of claim 4, further comprising:
wherein the allocation history of each node in the multi-node data storage system includes a first set of entries storing indications of the non-quarantined sets of physical blocks that are currently allocated to the node and are currently being used to provide non-volatile data storage to store dirty pages of user data flushed from the cache of the node; and
wherein the allocation history of each node in the multi-node data storage system includes a second set of entries storing indications of the quarantined sets of physical blocks that are no longer allocated to the node and are not currently being used to provide non-volatile data storage to store dirty pages of user data flushed from the cache of the node.

6. The method of claim 5, wherein each node in the multi-node data storage system initially indicates in its allocation history that each set of physical blocks that is allocated to the node to provide non-volatile data storage to store dirty pages of user data flushed from the cache of the node is non-quarantined at the time the set of physical blocks is allocated to the node by initially storing an indication of each set of physical blocks that is allocated to the node to provide non-volatile data storage to store dirty pages of user data flushed from the cache of the node within the first set of entries in its allocation history at the time the set of physical blocks is allocated to the node.

7. The method of claim 6, wherein each node in the multi-node data storage system modifies its allocation history to indicate that each set of physical blocks previously allocated to the node to provide non-volatile data storage to store dirty pages of user data flushed from the cache of the node is quarantined instead of non-quarantined prior to removing the indication of the set of physical blocks from its allocation history by moving the indication of the set of physical blocks from the first set of entries in the allocation history of the node to the second set of entries in the allocation history of the node prior to removing the indication of the set of physical blocks from the allocation history.

8. The method of claim 7, wherein each node in the multi-node data storage system delays removal an individual indication of a set of physical blocks stored in the second set of entries in the allocation history of the node from the second set of entries in the allocation history of the node until after detecting that a predetermined number of indications of sets physical blocks have been moved from the first set of entries in the allocation history of the node to the second set of entries in the allocation history of the node after the indication of the set of physical blocks was moved to the second set of entries in the allocation history of the node from the first set of entries in the allocation history of the node.

9. A multi-node data storage system comprising:
a plurality of nodes, each node including processing circuitry and a memory;
a plurality of non-volatile data storage drives communicably coupled to the plurality of nodes; and
wherein the memory of each node has program code stored thereon, wherein the program code, when executed by the processing circuitry of the node, causes the processing circuitry of the node to:
maintain an allocation history indicating sets of physical blocks previously allocated to the node for storing dirty pages of user data flushed from a cache of the node, wherein the allocation history indicates non-quarantined sets of physical blocks that are currently allocated to the node and are currently being used to provide non-volatile data storage to cache flush operations that store dirty pages of user data flushed from the cache of the node, and wherein the allocation history also indicates quarantined sets of physical blocks that are no longer allocated to the node and are not currently being used to provide non-volatile data storage to cache flush operations that store dirty pages of user data flushed from the cache of the node; and
process requests from the nodes of the multi-node data storage system for allocation of sets of physical blocks for storing dirty pages of user data flushed from their caches by reading the allocation histories maintained by the nodes of the multi-node data storage system, and preventing allocation of sets of physical blocks that are indicated as non-quarantined by any of the allocation histories, and also preventing allocation of sets of physical blocks that are indicated as quarantined by any of the allocation histories.

10. The multi-node data storage system of claim 9, wherein the program code stored in the memory of each node, when executed by the processing circuitry of the node, causes the processing circuitry of the node to initially indicate in its allocation history that each set of physical blocks that is allocated to the node to provide non-volatile data storage to store dirty pages of user data flushed from the cache of the node is non-quarantined at the time the set of physical blocks is allocated to the node.

11. The multi-node data storage system of claim 10, wherein the program code stored in the memory of each node, when executed by the processing circuitry of the node, causes the processing circuitry of the node to modifies the node's allocation history to indicate that each individual set of physical blocks previously allocated to the node to provide non-volatile data storage to store dirty pages of user data flushed from the cache of the node is quarantined instead of non-quarantined prior to removing an indication of that set of physical blocks from its allocation history.

12. The multi-node data storage system of claim 11, wherein the program code stored in the memory of each node, when executed by the processing circuitry of the node, causes the processing circuitry of the node to modify the allocation history of the node to indicate that an individual set of physical blocks previously allocated to the node to provide non-volatile data storage to store dirty pages of user data flushed from the cache of the node is quarantined instead of non-quarantined responsive to having used all of the free physical blocks in the set of physical blocks to store dirty pages of user data flushed from the cache of the node.

13. The multi-node data storage system of claim 12, further comprising:
   wherein the allocation history of each node in the multi-node data storage system includes a first set of entries storing indications of the non-quarantined sets of physical blocks that are currently allocated to the node and are currently being used to provide non-volatile data storage to store dirty pages of user data flushed from the cache of the node; and
   wherein the allocation history of each node in the multi-node data storage system includes a second set of entries storing indications of the quarantined sets of physical blocks that are no longer allocated to the node and are not currently being used to provide non-volatile data storage to store dirty pages of user data flushed from the cache of the node.

14. The multi-node data storage system of claim 13, wherein the program code stored in the memory of each node, when executed by the processing circuitry of the node, causes the processing circuitry of the node to initially indicates in the allocation history of the node that each set of physical blocks that is allocated to the node to provide non-volatile data storage to store dirty pages of user data flushed from the cache of the node is non-quarantined at the time the set of physical blocks is allocated to the node by initially storing an indication of each set of physical blocks that is allocated to the node to provide non-volatile data storage to store dirty pages of user data flushed from the cache of the node within the first set of entries in its allocation history at the time the set of physical blocks is allocated to the node.

15. The multi-node data storage system of claim 14, wherein the program code stored in the memory of each node, when executed by the processing circuitry of the node, causes the processing circuitry of the node to modify the allocation history of the node to indicate that each set of physical blocks previously allocated to the node to provide non-volatile data storage to store dirty pages of user data flushed from the cache of the node is quarantined instead of non-quarantined prior to removing the indication of the set of physical blocks from its allocation history by moving the indication of the set of physical blocks from the first set of entries in the allocation history of the node to the second set of entries in the allocation history of the node prior to removing the indication of the set of physical blocks from the allocation history.

16. The multi-node data storage system of claim 15, wherein the program code stored in the memory of each node, when executed by the processing circuitry of the node, causes the processing circuitry of the node to delay removal of an individual indication of a set of physical blocks stored in the second set of entries in the allocation history of the node from the second set of entries in the allocation history of the node until after detecting that a predetermined number of indications of sets physical blocks have been moved from the first set of entries in the allocation history of the node to the second set of entries in the allocation history of the node after the indication of the set of physical blocks was moved to the second set of entries in the allocation history of the node from the first set of entries in the allocation history of the node.

17. A computer program product including a non-transitory computer readable medium having instructions stored thereon, wherein the instructions, when executed on processing circuitry, cause the processing circuitry to perform the steps of:
   maintaining, for each node in a multi-node data storage system, an allocation history indicating sets of physical blocks previously allocated to the node for storing dirty pages of user data flushed from a cache of the node, wherein the allocation history indicates non-quarantined sets of physical blocks that are currently allocated to the node and are currently being used to provide non-volatile data storage to cache flush operations that store dirty pages of user data flushed from the cache of the node, and wherein the allocation history also indicates quarantined sets of physical blocks that are no longer allocated to the node and are not currently being used to provide non-volatile data storage to cache flush operations that store dirty pages of user data flushed from the cache of the node; and
   processing requests from the nodes of the multi-node data storage system for allocation of sets of physical blocks for storing dirty pages of user data flushed from their caches by reading the allocation histories maintained by the nodes of the multi-node data storage system, and preventing allocation of sets of physical blocks that are indicated as non-quarantined by any of the allocation histories, and also preventing allocation of sets of physical blocks that are indicated as quarantined by any of the allocation histories.

* * * * *